(12) United States Patent
Joshi et al.

(10) Patent No.: US 12,401,802 B2
(45) Date of Patent: Aug. 26, 2025

(54) VIDEO CODING WITH GUIDED MACHINE LEARNING RESTORATION

(71) Applicant: Google LLC, Mountain View, CA (US)

(72) Inventors: Urvang Joshi, Mountain View, CA (US); Yue Chen, Kirkland, WA (US); Sarah Parker, San Francisco, CA (US); Elliott Karpilovsky, Santa Clara, CA (US); Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 119 days.

(21) Appl. No.: 18/272,862

(22) PCT Filed: Jan. 19, 2021

(86) PCT No.: PCT/US2021/013878
§ 371 (c)(1),
(2) Date: Jul. 18, 2023

(87) PCT Pub. No.: WO2022/159073
PCT Pub. Date: Jul. 28, 2022

(65) Prior Publication Data
US 2024/0098280 A1   Mar. 21, 2024

(51) Int. Cl.
*H04N 19/176* (2014.01)
*H04N 19/30* (2014.01)

(52) U.S. Cl.
CPC ........... *H04N 19/176* (2014.11); *H04N 19/30* (2014.11)

(58) Field of Classification Search
CPC .... H04N 19/176; H04N 19/30; H04N 19/154; H04N 19/197; H04N 19/172;
(Continued)

(56) References Cited

U.S. PATENT DOCUMENTS

2018/0293496 A1* 10/2018 Vogels ................. G06V 10/454
2019/0273948 A1*  9/2019 Yin ........................ G06N 3/045
(Continued)

FOREIGN PATENT DOCUMENTS

EP          3709648 A1     9/2020

OTHER PUBLICATIONS

International Search Report and Written Opionion of International Application No. PCT/US2021/013878 dated Oct. 12, 2021, 17 pgs.
(Continued)

*Primary Examiner* — Susan E. Hodges
(74) *Attorney, Agent, or Firm* — Young Basile Hanlon & MacFarlane, P.C.

(57) ABSTRACT

Image coding using guided machine learning restoration may include obtaining reconstructed frame data by decoding, obtaining a restored frame by restoring the reconstructed frame, and outputting the restored frame. Obtaining the restored frame may include obtaining a reconstructed block, obtaining guide parameter values, obtaining a restored block, and including the restored block in the restored frame. Obtaining the restored block may include inputting the reconstructed block to an input layer of a trained guided convolutional neural network, wherein the neural network is constrained such that an output layer has a defined cardinality of channels, obtaining, from the output layer, neural network output channel predictions, obtaining a guided neural network prediction as a linear combination of the guide parameter values and the neural network output channel predictions, and generating the restored block using the guided neural network prediction.

20 Claims, 9 Drawing Sheets

(58) Field of Classification Search
CPC ...... H04N 19/463; H04N 19/82; H04N 19/85; H04N 19/117
USPC .................................................. 375/240, 40
See application file for complete search history.

(56) References Cited

U.S. PATENT DOCUMENTS

2020/0053362 A1\* 2/2020 Fu .......................... G06N 3/045
2020/0186809 A1 6/2020 Mukherjee et al.

OTHER PUBLICATIONS

Alshina et al; "Description of Exploration Experiments on NN-based video coding", JVET Meeting; Oct. 31, 2020; Retrieved from the Internet: URL:https://jvetexperts.org/doc_end_user/documents/20Teleconference/wgll/JVET-T2023-v4, 18 pgs.

\* cited by examiner

VIDEO CODING WITH GUIDED MACHINE LEARNING RESTORATION

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using guided machine learning restoration.

SUMMARY

This application relates to encoding and decoding of image data, video stream data, or both for transmission or storage. Disclosed herein are aspects of systems, methods, and apparatuses for encoding and decoding using guided machine learning restoration.

An aspect is a method for image coding using guided machine learning restoration. Image coding using guided machine learning restoration may include generating a restored frame using guided machine learning restoration and outputting the restored frame. Generating the restored frame using guided machine learning restoration may include obtaining reconstructed frame data, wherein obtaining the reconstructed frame data includes decoding encoded frame data from an encoded bitstream. Generating the restored frame using guided machine learning restoration may include obtaining a restored frame. Obtaining the restored frame may include obtaining a reconstructed block from the reconstructed frame data, wherein the reconstructed block includes a defined input cardinality of pixel values, obtaining a trained guided convolutional neural network constrained such that an output layer of the trained guided convolutional neural network has a defined output cardinality of output channels, obtaining the defined output cardinality of guide parameter values, and obtaining a restored block. Obtaining the restored block may include inputting the reconstructed block to an input layer of the trained guided convolutional neural network, in response to inputting the reconstructed block to the input layer, obtaining, from the output layer, the defined output cardinality of neural network output channel predictions, wherein a respective neural network output channel prediction includes the defined input cardinality of neural network output channel predicted values, obtaining a guided neural network prediction as a linear combination of the guide parameter values and the neural network output channel predictions, and generating the restored block using the guided neural network prediction. Obtaining the restored frame may include including the restored block in the restored frame.

Another aspect is a method for image coding using guided machine learning restoration. Image coding using guided machine learning restoration may include generating an output bitstream using guided machine learning restoration and outputting an output bitstream. Generating the output bitstream using guided machine learning restoration may include obtaining source frame data, obtaining encoded frame data by encoding the source frame data, including the encoded frame data in an output bitstream, obtaining reconstructed frame data by decoding the encoded frame data, and obtaining restored frame data. Obtaining the restored frame data may include obtaining a reconstructed block from the reconstructed frame data, wherein the reconstructed block includes a defined input cardinality of reconstructed pixel values, obtaining a trained guided convolutional neural network constrained such that an output layer of the trained guided convolutional neural network has a defined output cardinality of output channels, obtaining the defined output cardinality of guide parameter values, and obtaining a restored block. Obtaining the restored block may include inputting the reconstructed block to an input layer of the trained guided convolutional neural network, in response to inputting the reconstructed block to the input layer, obtaining, from the output layer, the defined output cardinality of neural network output channel predictions, wherein a respective neural network output channel prediction includes the defined input cardinality of neural network output channel predicted values, obtaining a guided neural network prediction as a linear combination of the guide parameter values and the neural network output channel predictions, and generating the restored block using the guided neural network prediction. Obtaining the restored frame data may include including the guide parameter values in the output bitstream, and including the restored block in the restored frame data. Generating the output bitstream using guided machine learning restoration may include storing the restored frame data.

Another aspect is an apparatus for image coding using guided machine learning restoration. The apparatus may include a processor configured to generate a restored frame using guided machine learning restoration and output the restored frame. The processor may be configured to generate the restored frame using guided machine learning restoration by obtaining reconstructed frame data, wherein obtaining the reconstructed frame data includes decoding encoded frame data from an encoded bitstream. Generating the restored frame using guided machine learning restoration may include obtaining a restored frame. Obtaining the restored frame may include obtaining a reconstructed block from the reconstructed frame data, wherein the reconstructed block includes a defined input cardinality of pixel values, obtaining a trained guided convolutional neural network constrained such that an output layer of the trained guided convolutional neural network has a defined output cardinality of output channels, obtaining the defined output cardinality of guide parameter values, and obtaining a restored block. Obtaining the restored block may include inputting the reconstructed block to an input layer of the trained guided convolutional neural network, in response to inputting the reconstructed block to the input layer, obtaining, from the output layer, the defined output cardinality of neural network output channel predictions, wherein a respective neural network output channel prediction includes the defined input cardinality of neural network output channel predicted values, obtaining a guided neural network prediction as a linear combination of the guide parameter values and the neural network output channel predictions, and generating the restored block using the guided neural network prediction. Obtaining the restored frame may include including the restored block in the restored frame.

Another aspect is an apparatus for image coding using guided machine learning restoration. The apparatus may include a processor configured to generate an output bitstream using guided machine learning restoration and output the output bitstream. The processor may be configured to generate the output bitstream using guided machine learning restoration by obtaining source frame data, obtaining encoded frame data by encoding the source frame data, including the encoded frame data in an output bitstream, obtaining reconstructed frame data by decoding the encoded frame data, and obtaining restored frame data. Obtaining the restored frame data may include obtaining a reconstructed block from the reconstructed frame data, wherein the reconstructed block includes a defined input cardinality of reconstructed pixel values, obtaining a trained guided convolutional neural network constrained such that an output layer of the trained guided convolutional neural network has a defined output cardinality of output channels, obtaining the defined output cardinality of guide parameter values, and obtaining a restored block. Obtaining the restored block may include inputting the reconstructed block to an input layer of the trained guided convolutional neural network, in response to inputting the reconstructed block to the input layer, obtaining, from the output layer, the defined output cardinality of neural network output channel predictions, wherein a respective neural network output channel prediction includes the defined input cardinality of neural network output channel predicted values, obtaining a guided neural network prediction as a linear combination of the guide parameter values and the neural network output channel predictions, and generating the restored block using the guided neural network prediction. Obtaining the restored frame data may include including the guide parameter values in the output bitstream, and including the restored block in the restored frame data. The processor may be configured to generate the output bitstream using guided machine learning restoration by storing the restored frame data.

Variations in these and other aspects will be described in additional detail hereafter.

BRIEF DESCRIPTION OF THE DRAWINGS

The description herein refers to the accompanying drawings wherein like reference numerals refer to like parts throughout the several views unless otherwise noted or otherwise clear from context.

DETAILED DESCRIPTION

Figure 1:
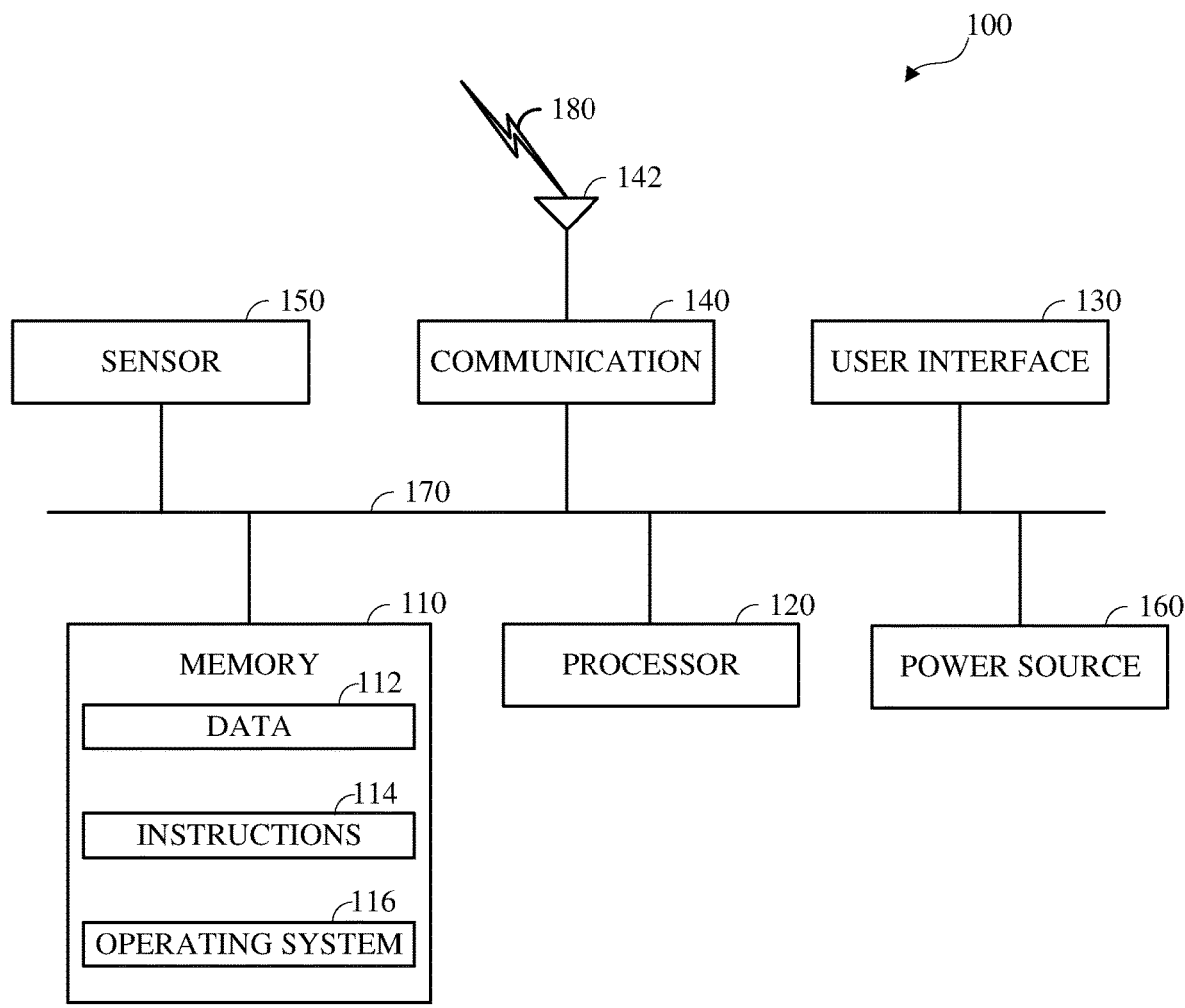
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

An encoded image may be decoded and reconstructed to obtain a reconstructed image. A reconstructed image may be a degraded image that differs from the corresponding source image. For example, lossy quantization in the encoding process may lead to artifacts in the reconstructed image. Decoding may include using one or more techniques, such as a deblocking filter, to partially remove or reduce artifacts in the reconstructed image. A machine learning model, such as an artificial neural network (ANN) model for image restoration may improve the accuracy of image restoration relative to ad-hoc techniques. Machine learning models designed to generate a restored image that minimizes differences from the corresponding source image may be relatively complex, such as having many layers, many nodes per layer, or both, and may have relatively high resource utilization.

Implementations of coding, such as encoding or decoding, using guided machine learning restoration may include using machine learning, which may include generating, or training, a predictive model, such as an artificial neural network (ANN) model, using training data. The predictive model may be used to obtain one or more predictions (output values) responsive to input data, such as source images. A trained, or automatically optimized, machine-learning model may be, for example, a guided convolutional neural network. The guided convolutional neural network architecture is such that the output (restored block) is constrained to be in the subspace generated by the output channels of the guided convolutional neural network. By reducing the degrees of freedom in the neural network, relative to other implementations of machine-learning models, such as unguided models, the model complexity may be reduced. For example, coding, such as encoding or decoding, using guided machine learning restoration may include using a machine learning model constrained to output multiple candidate reconstructed images such that the source image is within the subspace defined by the candidate reconstructed images. A reconstructed image may be generated based on a combination of the candidate reconstructed images and guide parameters. The encoder may determine guide parameters using weight optimization, such as least-squares optimization. The encoder may use guided machine learning restoration based on a previously encoded and reconstructed, or partially reconstructed, frame and the identified guide parameters to obtain a restored frame, which may be used as a reference frame for subsequent video coding. The encoder may signal the guide parameters in the output bitstream, along with other encoded frame data, such that a decoder may generate a reconstructed, or partially reconstructed, frame and may perform guided machine learning restoration using the reconstructed frame and the guide parameters signaled by the encoder to obtain a restored frame that may be presented to a user and used for subsequent video coding.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include multiple sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
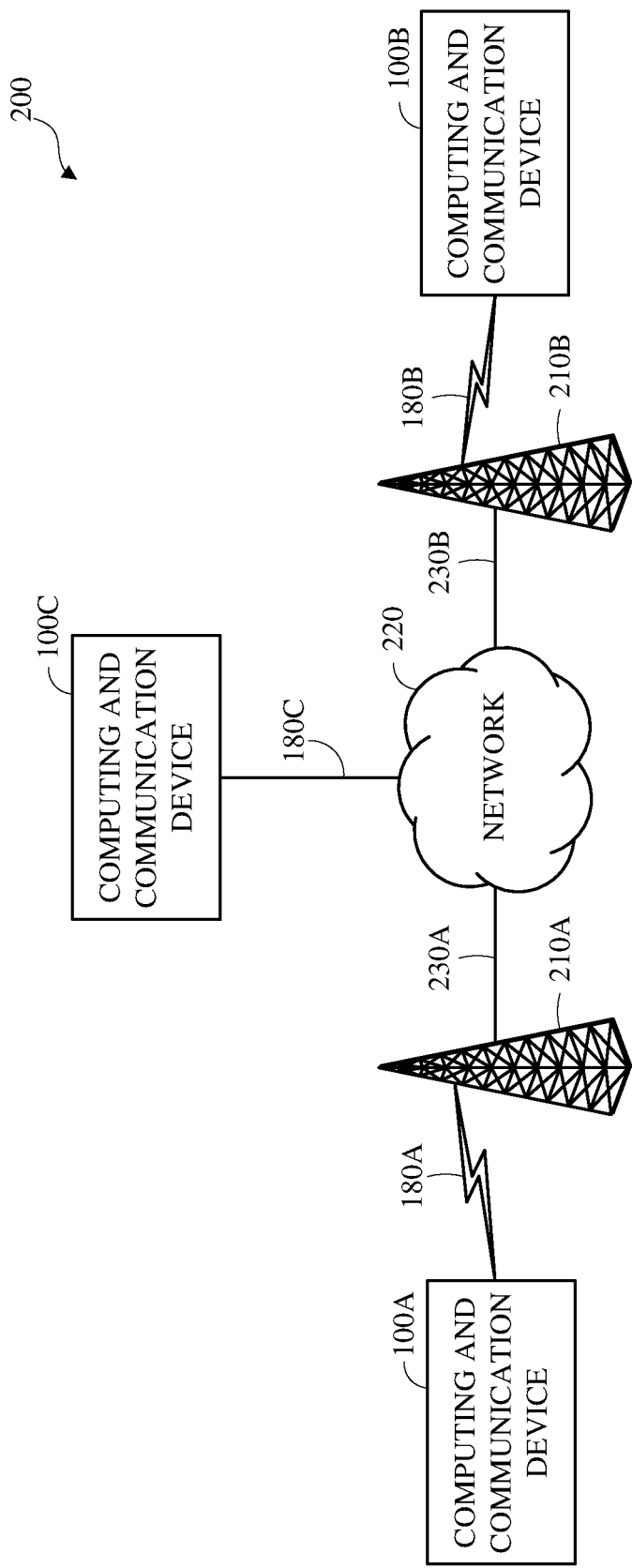
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
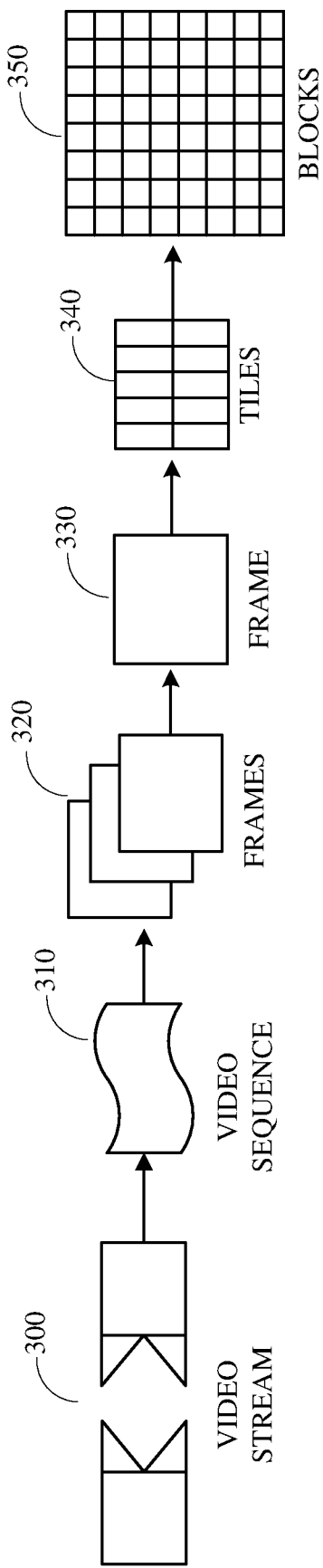
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
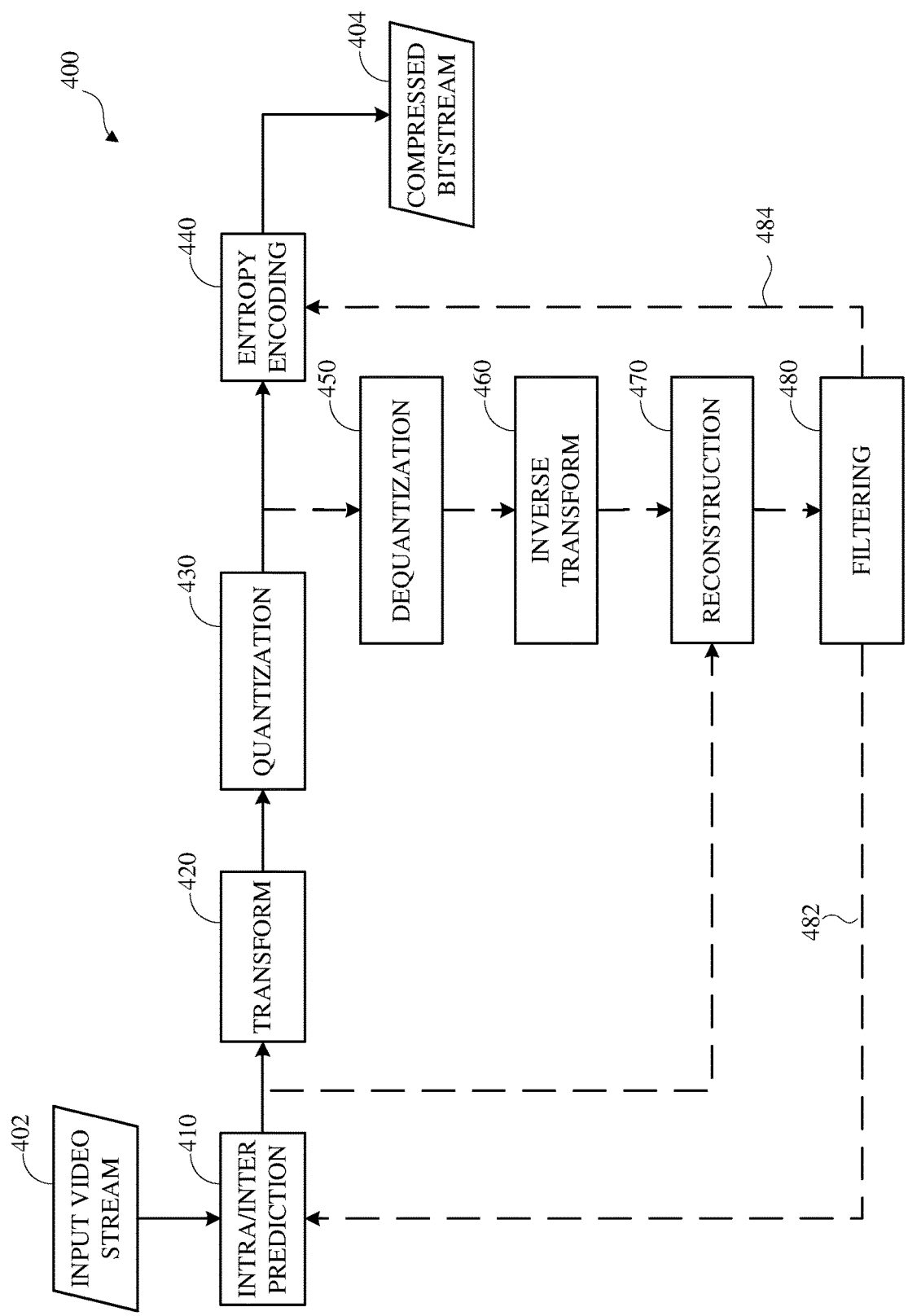
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loéve Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
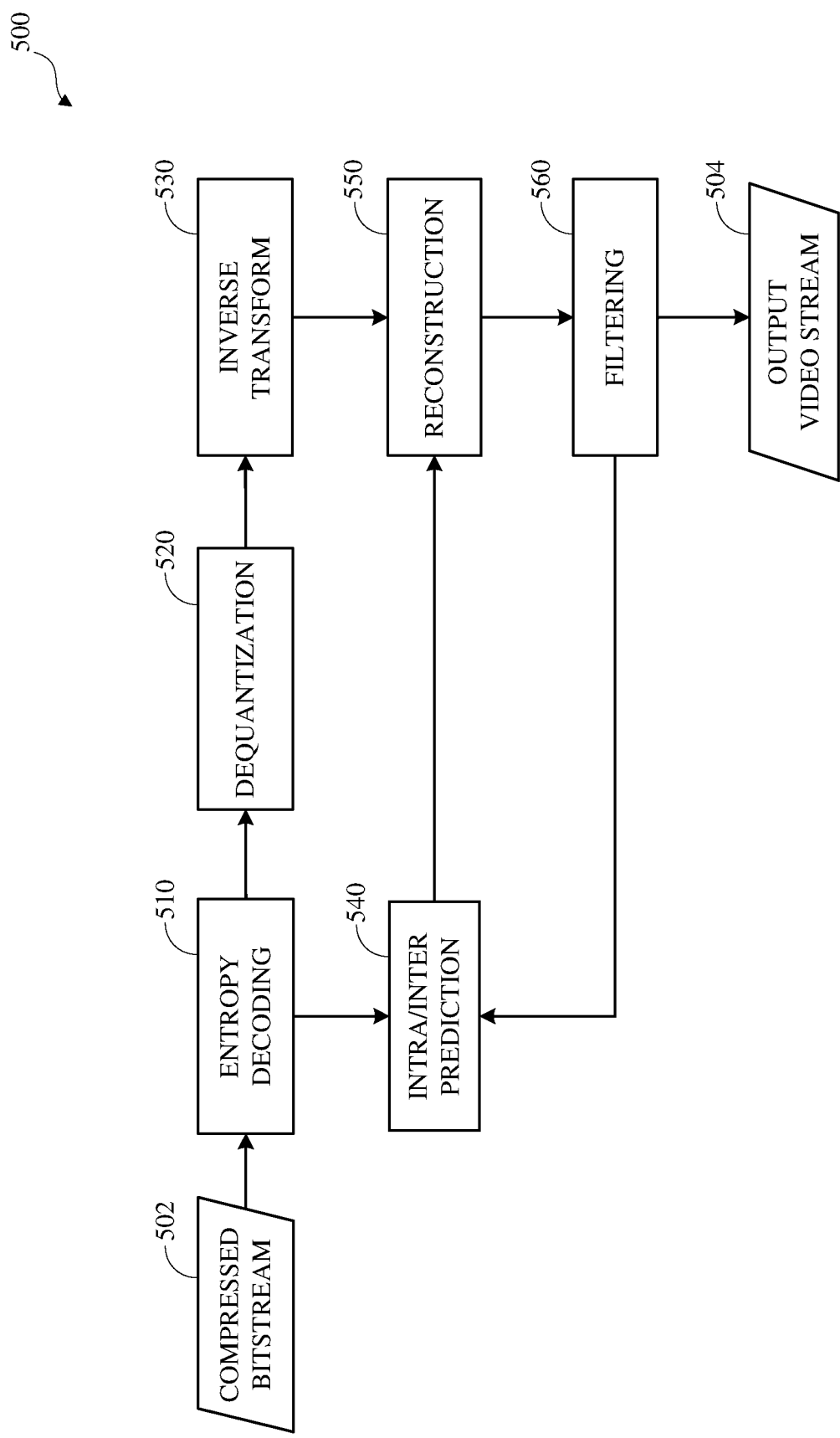
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
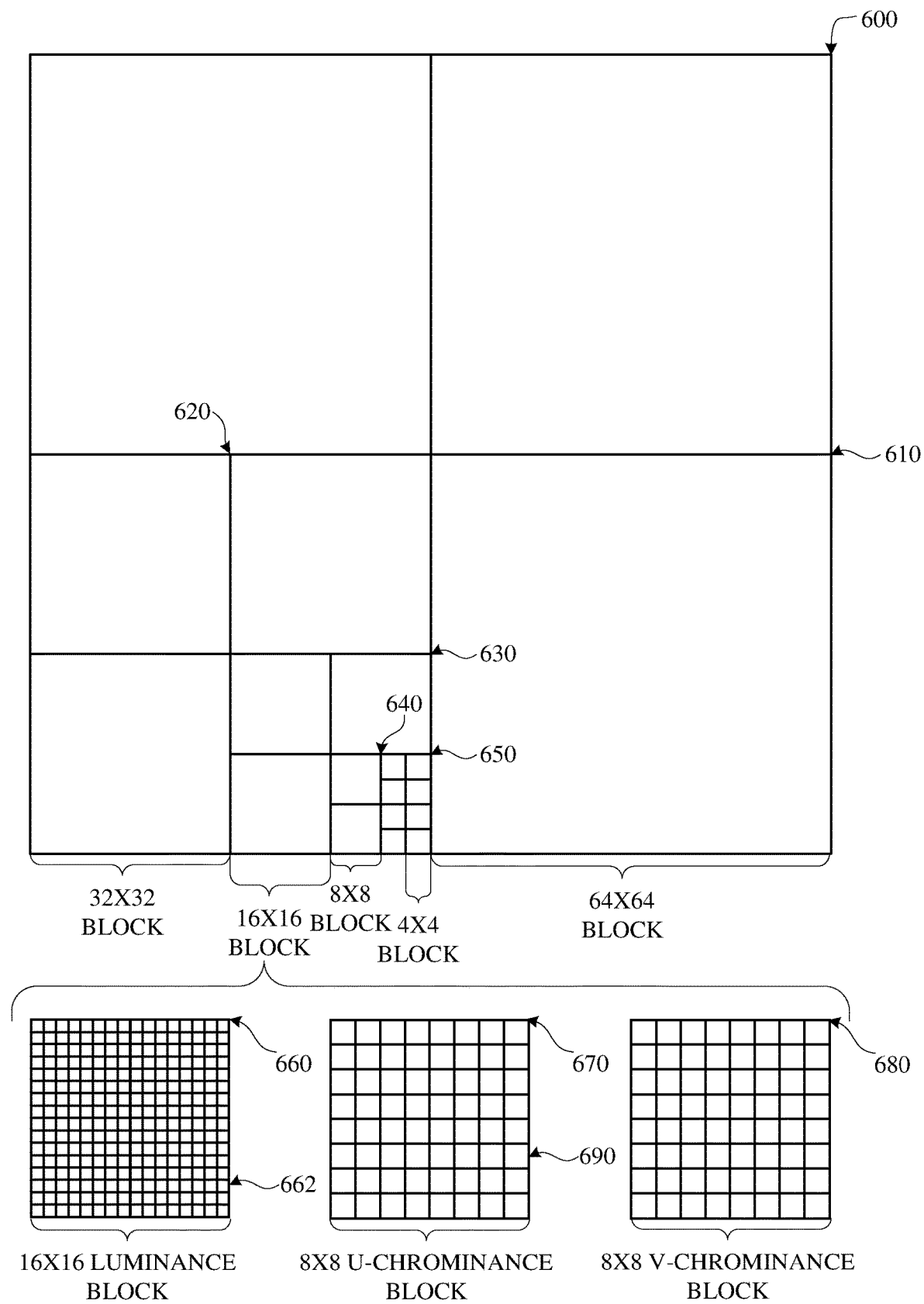
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a DCT. For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to a block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
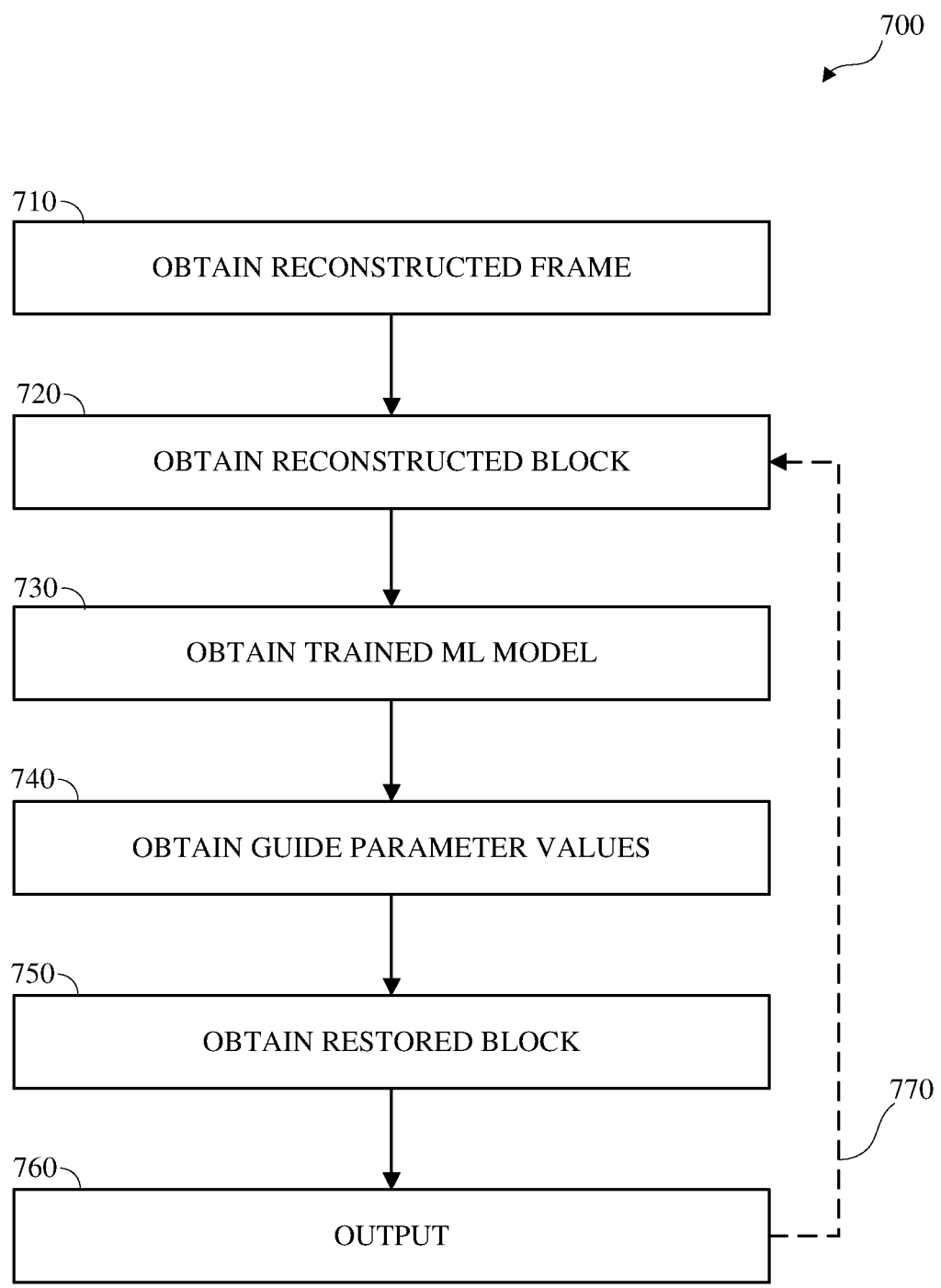
FIG. 7 is a flowchart diagram of an example of encoding using guided machine learning restoration in accordance with implementations of this disclosure.

FIG. 7 is a flowchart diagram of an example of encoding using guided machine learning restoration 700 in accordance with implementations of this disclosure. Encoding using guided machine learning restoration 700 may be implemented in an encoder, such as the encoder 400 shown in FIG. 4. For example, a filtering unit of the encoder, such as the filtering unit 480 of the encoder 400 shown in FIG. 4, may implement encoding using guided machine learning restoration 700.

Encoding using guided machine learning restoration 700 includes obtaining a reconstructed frame at 710, obtaining a reconstructed block at 720, obtaining a trained machine-learning model at 730, obtaining guide parameter values at 740, obtaining a restored block at 750, and outputting reconstruction data at 760.

Obtaining the reconstructed frame at 710 may include obtaining the reconstructed frame or a portion thereof, such as a reconstructed tile. The reconstructed frame may be a frame obtained, or generated, by combining prediction blocks, such as prediction blocks generated by a prediction unit of the encoder, such as the intra/inter prediction unit 410 of the encoder 400 shown in FIG. 4, with corresponding residual blocks, such as residual blocks obtained by an inverse transform unit of the encoder, such as the inverse transform unit 460 of the encoder 400 shown in FIG. 4. For example, the filtering unit may obtain the reconstructed frame from a reconstruction unit of the encoder, such as the reconstruction unit 470 of the encoder 400 shown in FIG. 4.

The reconstructed block is obtained at 720 from the reconstructed frame, or portion thereof, obtained at 710. In some implementations, the reconstructed block may correspond with a block, such as a prediction block or a transform block, used to obtain the reconstructed frame obtained at 710. In some implementations, the reconstructed block may be obtained from the reconstructed frame independent of the block used to obtain the reconstructed frame. For example, the reconstructed frame may be partitioned into fixed size blocks or using other partitioning, such as the partitioning used to partition the input frame. In some implementations, the reconstructed block may be a filtered reconstructed block. For example, although not shown separately in FIG. 7, the reconstructed frame obtained at 710 may be filtered, such as using a deblocking filter, to obtain a filtered, or partially filtered, reconstructed frame and the reconstructed block may be obtained from the filtered, or partially filtered, reconstructed frame.

Encoding using guided machine learning restoration 700 may include using machine learning. Machine learning may include generating, or training, a predictive model using training data. Encoding using guided machine learning restoration 700 may include using the predictive model to obtain one or more predictions (output values) responsive to input data. Encoding using guided machine learning restoration 700 may include using an artificial neural network (ANN) model.

Figure 8:
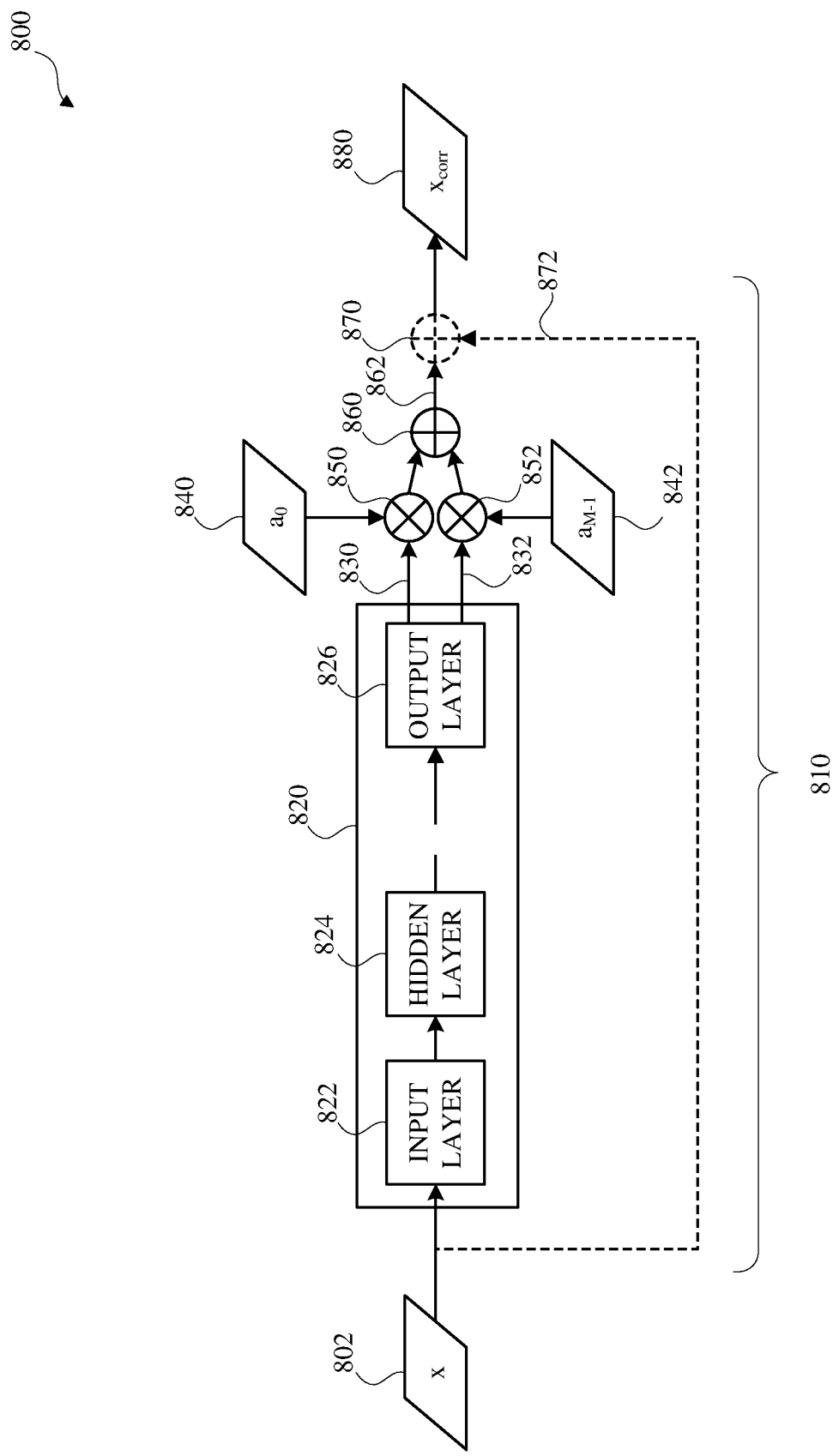
FIG. 8 is a flowchart diagram of an example of coding using a guided convolutional neural network in accordance with implementations of this disclosure.

The trained, or automatically optimized, machine-learning model is obtained at 730. The trained, or automatically optimized, machine-learning model may be a guided convolutional neural network as described herein, or another machine-learning model. For simplicity and clarity, an example of a guided convolutional neural network is shown in FIG. 8. An example of training, or optimizing, the guided convolutional neural network is described with respect to FIG. 8.

Guide parameter values for obtaining the restored block using the machine-learning model are obtained at 740. An example of obtaining the guide parameter values at the encoder is described with respect to FIG. 8.

The restored block is obtained at 750 using the reconstructed block obtained at 720, the trained machine-learning model obtained at 730, and the guide parameter values obtained at 740. An example of obtaining the restored block at the encoder is described in the description of FIG. 8. Although shown separately in FIG. 7, obtaining the guide parameter values at 740 and obtaining the restored block at 750 may be combined.

Reconstruction data is output at 760. Outputting the reconstruction data at 760 may include storing, or otherwise making the reconstruction data, or a portion thereof, accessible to other components of the encoder. Outputting the reconstruction data at 760 may include including the reconstruction data, or a portion thereof, in an output bitstream. Outputting the reconstruction data at 760 may include outputting the restored block, such as by including the restored block in a restored frame. For example, the restored frame may be output, or stored, as the reconstructed frame for use as a reference frame for encoding another portion of the current frame, another frame, or both, as indicated by the broken line shown at 482 in FIG. 4. Although not shown separately in FIG. 7, one or more filters, such as in-loop filters, may be applied to the reconstructed block or frame, including the restored block, subsequent to obtaining the restored block at 750.

Outputting the reconstruction data at 760 includes outputting coding information, including the guide parameter values obtained at 740, by including the coding information in an encoded bitstream, such as the compressed bitstream 404 shown in FIG. 4, as indicated by the broken line shown at 484 in FIG. 4. In some implementations, the block partitioning type, block size, or both, used for encoding using guided machine learning restoration 700 may be indicated in the encoded bitstream, such as in a header, such as a frame header or a tile header. The coding information, or a portion thereof, may be included in the compressed bitstream on a block basis, a tile basis, a frame basis, for a set or sequence of frames, for a scene, for a video, or based on another portion of a video or image.

Encoding using guided machine learning restoration 700 may be performed for other blocks of the current frame as indicated by the broken line at 770.

Although not shown expressly in FIG. 7, generating an encoded block by encoding using guided machine learning restoration 700 may include performing other elements of video encoding, such as transformation by a transform unit, such as the transform unit 420 shown in FIG. 4, quantization by a quantization unit, such as the quantization unit 430 shown in FIG. 4, entropy coding by an entropy coding unit, such as the entropy coding unit 440 shown in FIG. 4, dequantization by a dequantization unit, such as the dequantization unit 450 shown in FIG. 4, inverse transformation by an inverse transform unit, such as the inverse transform unit 460 shown in FIG. 4, reconstruction by a reconstruction unit, such as the reconstruction unit 470 shown in FIG. 4, or any other aspect of video coding.

Figure 9:
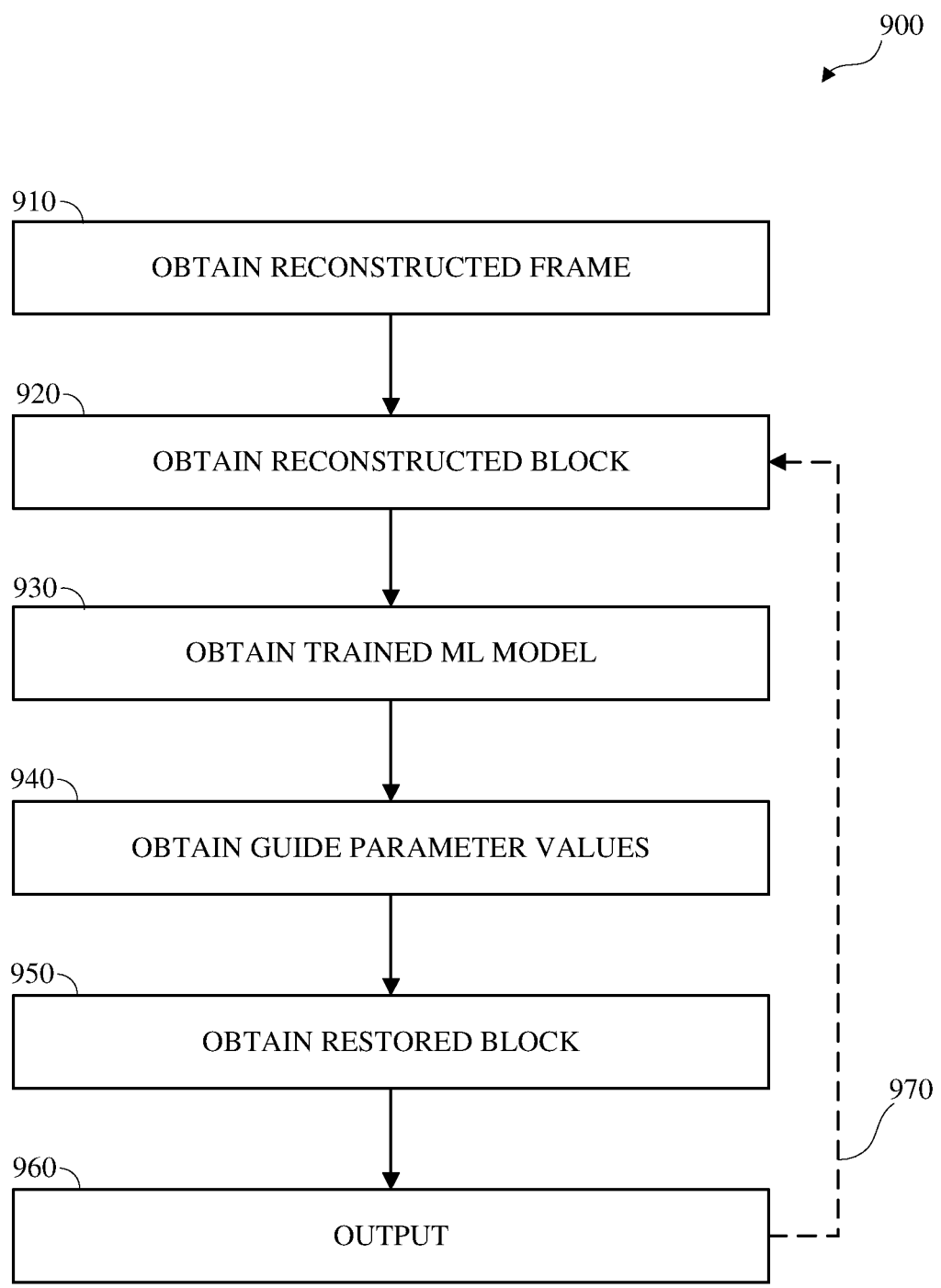
FIG. 9 is a flowchart diagram of an example of decoding using guided machine learning restoration in accordance with implementations of this disclosure.

Other implementations of encoding using guided machine learning restoration 700 are available. For example, other classes of artificial neural networks may be used. In some implementations, additional elements of encoding using guided machine learning restoration can be added, certain elements can be combined, and/or certain elements can be removed. FIG. 8 is a flowchart diagram of an example of coding using a guided convolutional neural network 800 in accordance with implementations of this disclosure. Coding (encoding) using a guided convolutional neural network 800 may be implemented in an encoder, such as the encoder 400 shown in FIG. 4. For example, a filtering unit of the encoder, such as the filtering unit 480 of the encoder 400 shown in FIG. 4, may implement coding (encoding) using a guided convolutional neural network 800. Encoding using guided machine learning restoration 700 as shown in FIG. 7 may include coding (encoding) using a guided convolutional neural network 800 as shown in FIG. 8. Coding (decoding) using a guided convolutional neural network 800 may be implemented in a decoder, such as the decoder 500 shown in FIG. 5. For example, a filtering unit of the decoder, such as the filtering unit 560 of the decoder 500 shown in FIG. 5, may implement coding (decoding) using a guided convolutional neural network 800. Decoding using guided machine learning restoration 900 as shown in FIG. 9 may include coding (decoding) using a guided convolutional neural network 800 as shown in FIG. 8.

Coding using a guided convolutional neural network 800 may include using machine learning. Machine learning may include generating, or training, a predictive model using training data. Coding using a guided convolutional neural network 800 may include using the predictive model to obtain one or more predictions (output values) responsive to input data. Coding using a guided convolutional neural network 800 may include using an artificial neural network (ANN) model. As used herein, the term "neural network" indicates an artificial neural network, the term neuron indicates an artificial neuron.

The artificial neural network model includes layers that respectively include connected units (nodes or neurons) followed by nonlinearities. A layer is a set of nodes, or neurons, in a neural network that process a set of input features, or the output of those neurons. The artificial neural network model describes the layers for organizing and arranging nodes, or neurons, in the artificial neural network, including an input layer, an output layer, and intermediate, internal, or hidden layers.

The artificial neural network model describes the nodes, or artificial neurons. A node, or neuron, in an artificial neural network may receive, or otherwise access, input values and may generate an output value. For example, a node, or neuron, may calculate the output value by applying an activation function (nonlinear transformation) to a weighted sum of input values. A node in an artificial neural network may be expressed as a mathematical function, which may include describing or defining one or more parameters or thresholds for the node. A node in an artificial neural network may receive one or more input signals, determine an internal state subsequent to, or in accordance with, receiving the input signals (activation), and output an output signal based on (such as using or responsive to) the input signals and the internal state. The input signals may be associated with respective weighting values. The artificial neural network model may describe or define the weighting values. For example, determining the internal state may include determining a weighted sum of the input signals, transforming the sum, such as using an activation or transform function, which may be a non-linear function, and outputting the transformation result, or a function (output function) thereof.

The input layer, or first layer, may receive, or otherwise access, input data for the neural network (features). The nodes of the artificial neural network input layer (input nodes) may receive the artificial neural network input data. Input data for a layer other than the input layer may be output data from another, adjacent, layer of the neural network. Nodes in adjacent layers may be interconnected along edges. The artificial neural network model may describe or define weighting values associated with respective edges. A hidden layer may be a synthetic layer in a neural network between an input layer and an output layer. The hidden layers may include an activation function, such as for training. The output layer, or final layer, may output data indicating an answer or prediction of the neural network, such as responsive to the input data accessed by the input layer. The activation function may be a function that may use a weighted sum of inputs from a previous layer to generate data, which may be nonlinear, which may be output (output value), such as to a subsequent layer. The output nodes in the output layer of the artificial neural network may output prediction values based on (such as using or responsive to) the received input values.

Coding using a guided convolutional neural network 800 may include using an artificial neural network, such as a convolutional neural network (CNN) model. A convolutional neural network may be a neural network in which a layer is a convolutional layer. A convolutional neural network may include multiple convolutional layers. In some embodiments, a convolutional neural network may include one or more convolutional layers, one or more pooling layers, one or more dense, or fully connected, layers, or a combination thereof. A convolutional neural network may be a deep neural network, which may be a neural network including multiple hidden layers.

A convolutional layer may be a layer of the neural network that applies a convolutional filter to an input matrix, which may include performing one or more convolutional operations. A convolutional filter is a matrix having the rank (ordinality) of the input matrix, but a smaller shape (element dimensions). The respective elements, or cells, of a convolutional filter matrix may be single digit binary values, such as zero or one, which may be initialized, such as randomly, and trained to optimize. A convolutional operation may include element-wise multiplication of the convolutional filter and a portion, or slice, of the input matrix having the same rank and size as the convolutional filter. The convolutional operation may include a summation of the matrix resulting from the element-wise multiplication. The convolutional layer may perform a respective convolutional operation for the respective portions, or slices, of the input matrix.

A pooling layer may be a layer of the neural network that reduces a matrix, or matrices, output by a previous convolutional layer, to a smaller matrix. For example, a pooling layer may determine a maximum, or average, value for a pooled area (pooling operation). A pooling operation may divide the matrix (convolutional output) into respective portions, which may overlap, such as partially, wherein the difference in matrix position for respective adjacent portions may be referred to as a stride.

A dense, or fully connected layer, may be a layer of the neural network, such as a hidden layer, in which a respective node is connected to the nodes in a subsequent hidden layer.

Although a guided convolutional neural network 800 is described herein, other guided neural network, machine learning, or artificial intelligence models may be used.

The guided convolutional neural network architecture is such that the output (restored block) is constrained to be in the subspace generated by the output channels of the guided convolutional neural network. By reducing the degrees of freedom in the neural network, relative to other implementations of machine-learning models, such as unguided models, the model complexity may be reduced.

As shown in FIG. 8, input, or reference values, (X) may be obtained at 802. For example, the input (X) may be obtained as shown at 720 in FIG. 7. The input (X) may be an input block or matrix, such as a block of pixel values. The input (X) may be a reconstructed, or partially reconstructed, block, such as a partially restored or degraded block. The input block (X) may be expressed in column vector form including respective values for a cardinality (N) of pixels of the input block. For example, the input (X) may be an 8×8 block having 64 pixel values (N=64). The input (X) block may correspond to a respective source block (S). A difference (d), or error, between the input (X) block and the source block (S) may be expressed as d=S−x. The cardinality (N) of the set of values of the input (X) may be referred to as a defined input cardinality, indicating a number, count, or cardinality of input values, such as input pixel values.

The input (x) obtained at 802 may be input to, or otherwise accessed by, a guided convolutional neural network 810. The guided convolutional neural network 810 includes a convolutional neural network 820. The convolutional neural network 820 includes an input layer 822, a hidden layer 824, and an output layer 826. The convolutional neural network 820 may include one or more other layers subsequent to the hidden layer 824, as indicated by the ellipsis between the hidden layer 824 and the output layer 826. The input (x) obtained at 802 may be input to, or otherwise accessed by, the input layer 812 of the convolutional neural network 810.

The output layer 826 is constrained to have a cardinality (M) of output channels (r), $r_0, r_1, \ldots, r_{M-1}$, shown at 830, 832. In an example, the cardinality (M) of output channels may be two or three. The respective output channels (r) may have the size of the input (x). For example, the input (x) may be an 8×8 block having 64 pixel values, a first output channel ($r_0$) may include 64 output values, such as unweighted neural network channel predicted values, corresponding to the input (x), a second output channel ($r_1$) may include 64 output values corresponding to the input (x), and a third output channel ($r_2$) may include 64 output values corresponding to the input (x). Although two output channels 830, 832 are shown in FIG. 8, another cardinality of output channels may be used, as indicated by the ellipsis between 830 and 832. The cardinality (M) of output channels (r) may be referred to as a defined output cardinality, indicating a cardinality, count, or number of output channels. The defined cardinality may be greater than one, as in the illustrated example. The output, such as responsive to a respective input (x), of the output layer 826 of the convolutional neural network 820, which may include the defined output cardinality (M) of output channels (r), may be referred to as neural network output channel predictions wherein a neural network output channel prediction for a respective output channel $r_0, r_1, \ldots, r_{M-1}$, may include the input cardinality (N) of neural network output channel predicted values, such as predicted pixel values or predicted pixel correction values, which may be unweighted or unguided values.

Guide parameters, $a_0, a_1, \ldots, a_{M-1}$, or guide parameter values, which may be scalar values, are obtained, as input, by the guided convolutional neural network 810 as shown at 840, 842. A respective guide parameter, $a_0, a_1, \ldots, a_{M-1}$, or guide parameter value, is used as a weighting value to weight or guide, such as multiply, the respective output (neural network output channel predictions) of a corresponding output channel 830, 832, as shown at 850, 852, to obtain guided neural network channel predictions (per-channel) that include respective guided neural network channel predicted values.

The guided neural network channel predictions obtained as shown at 850, 852 may be combined, as shown at 860, to obtain a guided neural network predicted value ($r_{corr}$) 862. The guided neural network predicted value ($r_{corr}$) 862, which may be referred to as a guided neural network prediction, may be obtained as a linear combination, which may be expressed as the following:

$$r_{corr} = a_0 r_0 + a_1 r_1 + \ldots + a_{M-1} r_{M-1}.$$

As shown in FIG. 8, the guided neural network predicted value ($r_{corr}$) 862 may be combined (additive), as shown at 870, with the input (x), as shown at 872, to obtain, determine, or generate, a reconstructed, or restored, guided neural network restored value, or output, ($x_{corr}$), shown at 880, which may be expressed as $x_{corr} = x + r_{corr}$. The output ($x_{corr}$) may be referred to as a restored block. The guided convolutional neural network 800 may obtain, determine, or generate, the guided neural network predicted value ($r_{corr}$) 862 for the input (x) such that the guided neural network restored value ($x_{corr}$) 880 is closer to S than x. The combination shown at 870 and the data path for the input (x) to the combination shown at 870 are shown using broken lines to indicate that the combination shown at 870 may be omitted and the guided neural network predicted value ($r_{corr}$) 862 may be used as the guided neural network restored value ($x_{corr}$) 880.

The encoder may obtain the guide parameters, $a_0, a_1, \ldots, a_{M-1}$, by calculating the guide parameters, $a_0, a_1, \ldots, a_{M-1}$, for the input (x), which may be optimal weights, that minimize $|x_{corr} - s|^2 = |r_{corr} - d|^2$, such as by least-squares optimization, wherein $R = [r_0\ r_1\ \ldots\ r_{M-1}]$ indicates the output channels column-wise in matrix form of size N×M, which may be expressed as the following:

$$[a_0 a_1 \ldots a_{M-1}]^T = (R^T R)^{-1} R^T d.$$

The reconstruction error may be expressed as the following:

$$e = |d|^2 - d^T R (R^T R)^{-1} R^T d.$$

The decoder may omit calculating the guide parameters, $a_0, a_1, \ldots, a_{M-1}$, as performed by the encoder and may obtain the guide parameters, $a_0, a_1, \ldots, a_{M-1}$, by reading, or otherwise accessing the guide parameters, $a_0, a_1, \ldots, a_{M-1}$, such as by decoding the guide parameters, $a_0, a_1, \ldots, a_{M-1}$, from the encoded bitstream.

A trained convolutional neural network 820 may be obtained, at the encoder, using an untrained convolutional neural network and training data. As used herein, the term untrained convolutional neural network includes a partially trained convolutional neural network. The structure, such as the cardinality of input values, the cardinality of layers, and the cardinality of output channels, of the untrained convolutional neural network may correspond with the structure of the trained convolutional neural network. The training data may be source images or video frames, or respective portions thereof, such as blocks, identified as training data. The training data, or training set of data, may include a defined training cardinality (T) of training pairs, where a training pair is formed by a respective source block and a corresponding reconstructed block, {source, degraded}, which may be expressed as $\{s_i, x_i\}$, $i = 0, 1, \ldots, T-1$. The error for the ith training sample may be expressed as $d_i = s_i - x_i$, the corresponding output channels in matrix form may be expressed as $R_i = [r_{i,0}\ r_{i,1} \ldots r_{i,M-1}]$, wherein $r_{i,j}$ is the jth output channel corresponding to training sample $x_i$ passing through the network, and the reconstruction error for the training set may be expressed as the following:

$$E = \Sigma_i \{|d_i|^2 - d_i^T R_i (R_i^T R_i)^{-1} R_i^T d_i\}.$$

The terms $|d_i|^2$ may be independent of the network model parameters, and the loss function to minimize during training may be expressed as the following:

$$L = -\Sigma_i \{d_i^T R_i (R_i^T R_i)^{-1} R_i^T d_i\}.$$

The decoder may omit training the convolutional neural network 820 as performed by the encoder and may read or otherwise access the convolutional neural network 820, such as from memory or by reading data describing the convolutional neural network 820 from the encoded bitstream.

FIG. 9 is a flowchart diagram of an example of decoding using guided machine learning restoration 900 in accordance with implementations of this disclosure. Decoding using guided machine learning restoration 900 may be implemented in a decoder, such as the decoder 500 shown in FIG. 5. For example, a filtering unit of the decoder, such as the filtering unit 560 of the decoder 500 shown in FIG. 5, may implement decoding using guided machine learning restoration 900.

Decoding using guided machine learning restoration 900 includes obtaining a reconstructed frame at 910, obtaining a reconstructed block at 920, obtaining a trained machine-learning model at 930, obtaining guide parameter values at 940, obtaining a restored block at 950, and outputting reconstruction data at 960. Although not expressly shown in FIG. 9, decoding using guided machine learning restoration 900 may include other elements of decoding, such as obtaining an encoded bitstream, such as the compressed bitstream shown at 502 in FIG. 5, entropy decoding the encoded bitstream, or a portion thereof, such as shown at 510 in FIG. 5, dequantization, such as shown at 520 in FIG. 5, inverse transformation, such as shown at 530 in FIG. 5, prediction, such as shown at 540 in FIG. 5, and reconstruction, such as shown at 550 in FIG. 5.

Obtaining the reconstructed frame at 910 may include obtaining the reconstructed frame or a portion thereof, such as a reconstructed tile. The reconstructed frame may be a frame obtained, or generated, by combining prediction blocks, such as prediction blocks generated by a prediction unit of the decoder, such as the intra/inter prediction unit 540 of the decoder 500 shown in FIG. 5, with corresponding residual blocks, such as residual blocks obtained by an inverse transform unit of the decoder, such as the inverse transform unit 530 of the decoder 500 shown in FIG. 5. For example, the filtering unit may obtain the reconstructed frame from a reconstruction unit of the decoder, such as the reconstruction unit 550 of the decoder 500 shown in FIG. 5.

The reconstructed block is obtained at 920 from the reconstructed frame, or portion thereof, obtained at 910. In some implementations, the reconstructed block may correspond with a block, such as a prediction block or a transform block, used to obtain the reconstructed frame obtained at 910. In some implementations, the reconstructed block may be obtained from the reconstructed frame independent of the block used to obtain the reconstructed frame. For example, the reconstructed frame may be partitioned into fixed size blocks or using other partitioning, such as the partitioning used to partition the input frame. In some implementations, the reconstructed block may be a filtered reconstructed block. For example, although not shown separately in FIG. 9, the reconstructed frame obtained at 910 may be filtered, such as using a deblocking filter, to obtain a filtered, or partially filtered, reconstructed frame and the reconstructed block may be obtained from the filtered, or partially filtered, reconstructed frame. Although not shown separately in FIG. 9, decoding using guided machine learning restoration 900 may include obtaining one or more parameters for decoding using guided machine learning restoration 900, such as by decoding the parameters from an encoded bitstream, such as the compressed bitstream shown at 502 in FIG. 5, which may include decoding one or more parameters, flags, or other data indicating the block size or partitioning type for decoding using guided machine learning restoration 900.

A trained, or automatically optimized, machine-learning model is obtained at 930. The trained, or automatically optimized, machine-learning model may be a guided convolutional neural network as described herein, or another machine-learning model. For simplicity and clarity, an example of a guided convolutional neural network is shown in FIG. 8.

Guide parameter values for obtaining the restored block using the machine-learning model are obtained at 940. The guide parameters are obtained by decoding the guide parameters from the encoded bitstream. For example, respective guide parameters, $a_0, a_1, \ldots, a_{M-1}$, may be represented as integer values with a defined precision and signaled in the encoded bitstream. In an example, a guide parameter, such as $a_0$, may have a value, such as a floating-point value in a defined range, such as −0.5 to 1.5 (inclusive), which may be encoded using a defined step size, such as 0.25, which may be represented by defined set, or codebook, of values, such as the nine values {−0.5, −0.25, 0.0, 0.25, 0.5, 0.75, 1.0, 1.25, 1.5}. The encoder may clamp the unconstrained floating-point guide value, such as the value obtained using least squares optimization, to be a value in the defined range, which the encoder may quantize the clamped value to obtain a value from the codebook. A representation of the codebook value may be included in the encoded bitstream. The decoder may decode, from the encoded bitstream, the representation of the codebook value to obtain the guide parameter.

The restored block is obtained at 950 using the reconstructed block obtained at 920, the trained machine-learning model obtained at 930, and the guide parameter values obtained at 940. An example of obtaining the restored block at the decoder is described in the description of FIG. 8. Although shown separately in FIG. 9, obtaining the guide parameter values at 940 and obtaining the restored block at 950 may be combined.

The restored block is output at 960. Outputting the restored block at 960 may include storing or otherwise making the restored block, or a portion thereof, accessible to other components of the decoder. Outputting the reconstruction data at 960 may include outputting the restored block, such as by including the restored block in a restored frame. For example, the restored frame may be output as the reconstructed frame for display, such as output to the output video stream as shown at 504 in FIG. 5. In another example, the restored frame may be output for use as a reference frame for decoding another portion of the current frame, another frame, or both. Although not shown separately in FIG. 9, one or more filters, such as in-loop filters, post-processing filters, or both, may be applied to the reconstructed block or frame, including the restored block, subsequent to obtaining the restored block at 950.

Decoding using guided machine learning restoration 900 may be performed for other blocks of the current frame as indicated by the broken line at 970.

Although not shown expressly in FIG. 9, generating a decoded block by decoding using guided machine learning restoration 900 may include performing other elements of video decoding, such as entropy decoding encoded block data by an entropy decoding unit, such as the entropy decoding unit 510 shown in FIG. 5, dequantization by a dequantization unit, such as the dequantization unit 520 shown in FIG. 5, inverse transformation by an inverse transform unit, such as the inverse transform unit 530 shown in FIG. 5, reconstruction by a reconstruction unit, such as the reconstruction unit 550 shown in FIG. 5, or any other aspect of video coding. The restored block may be used as reference data for decoding the encoded block data.

Other implementations of decoding using guided machine learning restoration 900 are available. For example, other classes of artificial neural networks may be used. In some implementations, additional elements of encoding using guided machine learning restoration can be added, certain elements can be combined, and/or certain elements can be removed.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described to allow easy understanding of the application are not limiting. On the contrary, the application covers various modifications and equivalent arrangements included within the scope of the appended claims, which scope is to be accorded the broadest interpretation to encompass all such modifications and equivalent structure as is permitted under the law.

What is claimed is:
1. An apparatus, comprising:
    a processor configured to:
        obtain reconstructed frame data, wherein to obtain reconstructed frame data includes to decode encoded frame data from an encoded bitstream;

obtain a restored frame, wherein to obtain a restored frame includes to:
    obtain a reconstructed block from the reconstructed frame data, wherein the reconstructed block includes a defined input cardinality of pixel values;
    obtain a trained guided convolutional neural network constrained such that an output layer of the trained guided convolutional neural network has a defined output cardinality of output channels;
    obtain a set of guide parameter values, wherein a cardinality of the set of guide parameter values is the defined output cardinality;
    obtain a restored block, wherein to obtain a restored block includes to:
        input the reconstructed block to an input layer of the trained guided convolutional neural network;
        in response to inputting the reconstructed block to the input layer, obtain, from the output layer, the defined output cardinality of neural network output channel predictions, wherein a respective neural network output channel prediction includes the defined input cardinality of neural network output channel predicted values;
        obtain a guided neural network prediction as a linear combination of the guide parameter values and the neural network output channel predictions; and
        generate the restored block using the guided neural network prediction; and
    include the restored block in the restored frame; and
    output the restored frame.

2. The apparatus of claim 1, wherein the defined output cardinality is greater than one.

3. The apparatus of claim 1, wherein to obtain the guide parameter values includes to decode the guide parameter values from the encoded bitstream.

4. The apparatus of claim 1, wherein to generate the restored block includes to use the guided neural network prediction as the restored block.

5. The apparatus of claim 1, wherein to generate the restored block includes to determine a sum of the reconstructed block and the guided neural network prediction as the restored block.

6. The apparatus of claim 1, wherein to decode the encoded frame data includes to generate the reconstructed block by decoding first encoded block data from the encoded frame data, and the processor is configured to:
    generate a second reconstructed block by decoding second encoded block data from the encoded frame data using the restored block as reference data.

7. The apparatus of claim 1, wherein the processor is configured to:
    obtain second reconstructed frame data, wherein to obtain the second reconstructed frame data includes to decode second encoded frame data from the encoded bitstream using the restored frame as a reference frame.

8. An apparatus, comprising:
a processor configured to:
    obtain source frame data;
    obtain encoded frame data by encoding the source frame data;
    include the encoded frame data in an output bitstream;
    obtain reconstructed frame data by decoding the encoded frame data;
    obtain restored frame data, wherein to obtain the restored frame data includes to:
        obtain a reconstructed block from the reconstructed frame data, wherein the reconstructed block includes a defined input cardinality of reconstructed pixel values;
        obtain a trained guided convolutional neural network constrained such that an output layer of the trained guided convolutional neural network has a defined output cardinality of output channels;
        obtain a set of guide parameter values, wherein a cardinality of the set of guide parameter values is the defined output cardinality;
        obtain a restored block, wherein to obtain the restored block includes to:
            input the reconstructed block to an input layer of the trained guided convolutional neural network;
            in response to inputting the reconstructed block to the input layer, obtain, from the output layer, the defined output cardinality of neural network output channel predictions, wherein a respective neural network output channel prediction includes the defined input cardinality of neural network output channel predicted values;
            obtain a guided neural network prediction as a linear combination of the guide parameter values and the neural network output channel predictions; and
            generate the restored block using the guided neural network prediction;
        include the guide parameter values in the output bitstream; and
        include the restored block in the restored frame data;
    store the restored frame data; and
    output the output bitstream.

9. The apparatus of claim 8, wherein to obtain the guide parameter values includes to determine the guide parameter values using least-squares optimization.

10. The apparatus of claim 8, wherein to obtain the trained guided convolutional neural network includes to:
    obtain an untrained convolutional neural network;
    obtain training data including a defined training cardinality of training pairs, wherein a training pair includes a source block and a corresponding reconstructed block; and
    train the untrained convolutional neural network using the training data to obtain the trained guided convolutional neural network.

11. The apparatus of claim 8, wherein to generate the restored block includes to use the guided neural network prediction as the restored block.

12. The apparatus of claim 8, wherein to generate the restored block includes to determine, as the restored block, a sum of the reconstructed block and the guided neural network prediction.

13. The apparatus of claim 8, wherein to decode the encoded frame data includes to generate the reconstructed block by decoding first encoded block data from the encoded frame data, and the processor is configured to:
    generate a second reconstructed block by decoding second encoded block data from the encoded frame data using the restored block as reference data.

14. The apparatus of claim 8, wherein the processor is configured to:
  obtain second source frame data;
  obtain second encoded frame data by encoding the second source frame data using the restored frame data as reference data; and
  include the second encoded frame data in the output bitstream.

15. A method, comprising:
  obtaining reconstructed frame data, wherein obtaining the reconstructed frame data includes decoding encoded frame data from an encoded bitstream;
  obtaining a restored frame, wherein obtaining the restored frame includes:
    obtaining a reconstructed block from the reconstructed frame data, wherein the reconstructed block includes a defined input cardinality of pixel values;
    obtaining a trained guided convolutional neural network constrained such that an output layer of the trained guided convolutional neural network has a defined output cardinality of output channels;
    obtaining a set of guide parameter values, wherein a cardinality of the set of guide parameter values is the defined output cardinality;
    obtaining a restored block by:
      inputting the reconstructed block to an input layer of the trained guided convolutional neural network;
      in response to inputting the reconstructed block to the input layer, obtaining, from the output layer, the defined output cardinality of neural network output channel predictions, wherein a respective neural network output channel prediction includes the defined input cardinality of neural network output channel predicted values;
      obtaining a guided neural network prediction as a linear combination of the guide parameter values and the neural network output channel predictions; and
      generating the restored block using the guided neural network prediction; and
    including the restored block in the restored frame; and
  outputting the restored frame.

16. The method of claim 15, wherein the defined output cardinality is greater than one.

17. The method of claim 15, wherein obtaining the guide parameter values includes decoding the guide parameter values from the encoded bitstream.

18. The method of claim 15, wherein generating the restored block includes using the guided neural network prediction as the restored block.

19. The method of claim 15, wherein generating the restored block includes determining a sum of the reconstructed block and the guided neural network prediction as the restored block.

20. The method of claim 15, wherein decoding the encoded frame data includes generating the reconstructed block by decoding first encoded block data from the encoded frame data, the method further comprising:
  generating a second reconstructed block by decoding second encoded block data from the encoded frame data using the restored block as reference data.

* * * * *